Dec. 3, 1963

W. T. DARNELL 3,113,062

APPARATUS FOR SPRAY DRYING PULVERULENT MATERIALS

Filed Oct. 17, 1958

Fig. 1.

Fig. 2.

INVENTOR
WALTER T. DARNELL
BY C. H. Mortenson
ATTORNEY

United States Patent Office 3,113,062
Patented Dec. 3, 1963

3,113,062
APPARATUS FOR SPRAY DRYING PULVERULENT MATERIALS
Walter T. Darnell, 19A Court Drive, Wilmington 5, Del.
Filed Oct. 17, 1958, Ser. No. 767,836
8 Claims. (Cl. 159—4)

This invention relates to drying pulverulent materials and to apparatus and methods thereof. More particularly, this invention relates to a method for creating an improved flow of fluid drying medium and to apparatus for effecting improved drying.

Hitherto, drying of pulverulent particles was accomplished by causing the drying medium to flow in the drying chamber in a turbulent manner. The particles to be dried were injected into the turbulent drying medium, and one could not determine accurately the particle travel path precisely nor the retention time of a particle within the drying chamber. Because different particles were retained in the drier for different time lengths, uniform drying rate was not attained. Accordingly, certain particles were heated more, being consequently drier than other particles. Non-uniform drying, in many instances, affected the final product adversely, either injuring the product, as for example, with food-stuffs or making it difficult to place the product in its original liquid form.

Accordingly, an object of this invention is the provision of methods for distributing fluid flow through a chamber in a uniform fashion. Another object is to minimize turbulence. Still another object is providing apparatus for producing substantially uniform straight line flow. These and other objects will appear hereinafter.

The objects of this invention are accomplished by passing the fluid drying medium, usually a heated gas, through an inlet into the chamber into which the material to be dried is being fed, the gas inlet being located above the inlet for the material being dried and being located near a foraminous plate which extends vertically in the chamber. Thus, all or most of the incoming medium, is forced through the foraminous distributor which is located away from the inlet at about 1 to about 2 times the diameter of the inlet, and the medium is broken up into smaller streams. That portion of the medium which does not go through the plate is forced downwardly, for the spray drier is usually positioned vertically, and this portion and the bulk of the medium passing through the foraminous distributor are forced through a second foraminous plate which is located a short distance from the end of the first plate. This second plate extends transversely in the chamber. All the drying medium, whether it passes through the first plate, downwardly to its lower end or under this end, is forced through the second plate, but with the distribution effected by the first plate the medium is fed in a substantially uniform manner to the second plate.

Thus, the apparatus of this invention comprises a material treating chamber which has an inlet for the liquid, semi-solid or solid material that is to be dried, and inlet for the fluid drying medium, and a means, comprising at least two foraminous plates, for distributing the drying medium in substantially straight-line, uniform flow. While the chamber has an outlet for the drying material and a collection means for the dried material, it is substantially enclosed and is usually in a vertical position. The material dispensing means is usually positioned at the top in the center of the second baffle and generally has a rotating atomizing disk. The top or inlet section of the chamber comprising the inlet and the foraminous plates provides a distributing head and uniform straight-line flow. By this invention the turbulence is minimized and all the materials passing through the chamber are uniformly distributed. The drying rate is uniform, for each particle of the wet material is subjected to about the same amount of heat for about the same period of time. The dried product has uniform dryness and other physical characteristics so that it may be reconverted to its original consistency with ease.

This invention will be further understood by reference to the description and figures which follow, in which:

FIG. 1 is a side elevational partially in section of one form of apparatus embodying the present invention; and
FIG. 2 is a transverse sectional view on line 2—2 of FIG. 1.

Referring to FIG. 1, reference numeral 10 designates generally a spray dryer comprising a cylindrical drying chamber 11 which terminates at its discharge end in a conical portion 12 to which a discharge duct 13 is connected. The top of the chamber is closed by a flat top portion 14. The drying medium enters the chamber 11 through an inlet duct 15 which extends radially with respect to the chamber adjacent the upper end thereof. The material to be dried may be dispersed into the chamber by any conventional injecting or dispersing apparatus, preferably in such a manner that the particles of material being dried are dispersed uniformly throughout a major portion of the upper end of the drying chamber. As shown, a central cylinder 16, having a vertical axis coincident with the vertical axis of the drying chamber, projects downwardly into the drying chamber 11 and supports a rotatable atomizing disc 17 for dispersing the particles to be dried into the chamber. This distributes the particles to be dried uniformly to the drying medium streams.

In accordance with the present invention, means are provided to cause uniform straight-line flow of the drying medium through the drying chamber so that at any cross section through the chamber, the flow of drying medium follows a straight line or is substantially straight and the velocity of flow at each point across the section is substantially the same as the velocity at each other point across the section. To accomplish this, baffle means are mounted in the upper portion of the chamber so that the drying medium entering through the inlet duct 15 is diffused to cause a substantially straight-line flow in the drying chamber with a uniform flow distribution at all points transversely of the chamber. In the illustrated embodiment of the present invention, a transverse baffle plate 18, one of at least two co-acting distributors, is carried by the chamber extending transversely of the upper end of the drying chamber and usually in substantially parallel relationship with the top plate 14 of said chamber. The transverse baffle plate 18 is preferably located as shown in FIG. 1 intermediate the atomizing disc 17 and the top plate 14 and is more preferably disposed therebetween a distance below the top plate proportional to a ratio of the inlet duct diameter $d_i$ and the chamber diameter $d_c$. In the actual embodiment the distance the transverse baffle plate 18 is spaced from the top of the chamber, referred to has $h_t$, is equal to approximately ⅜ the chamber diameter $d_c$ plus ½ the inlet duct diameter $d_i$. As a further important element of this invention, a vertical baffle plate 19 is affixed to the top plate 14 and extends downwardly toward the transverse baffle plate 18. The substantially vertical plate 19 is preferably mounted between the dispensing means and the inlet duct 15 and is positioned to allow a clearance between the lower edge of said vertical baffle plate 19 and the upper surface of the transverse baffle plate 18. In the illustrated embodiment, the baffle plate 19 protrudes downwardly from the top a distance $b$ that may vary from a distance equal to the diameter of the inlet duct $d_i$ to ⅓ the chamber diameter $d_c$ plus ½ the inlet duct diameter $d_i$. The clearance between the two plates or baffles may be from about $\frac{1}{12}$ to about $\frac{1}{4}$ of the drying chamber diameter, $d_c$.

In the preferred embodiment as shown in FIG. 1, the lateral displacement $a$ of the vertical baffle plate 19 from the end of the inlet duct 15 may range from one to two times the inlet duct diameter $d_i$. While it is preferable to have the baffle plate 19 substantially vertical or substantially at right angles to the baffle plate 18, the baffle plate 19 may also be positioned at a small angle, for example, up to approximately 20°, from the vertical, either toward or away from the inlet.

In addition to the proper positioning of the baffle plates in the top portion of the chamber to achieve thereby substantially uniform straight-line flow of the drying medium through the chamber, an equally important feature of the present invention is that the plates be provided with openings 20, 20 therein to diffuse the drying medium properly. Preferably, the openings 20 comprise a plurality of grilled apertures extending through the plates, arranged to form a uniform pattern. More preferably, the openings 20 are arranged to extend transversely of the baffle plates. The perforated, substantially vertical baffle plate 19 may have an open area in the order of from 23 to 40% of the total area and the transverse baffle plate may have an open area ranging from 12 to 40% of the total area. When, for example the value of the inlet duct diameter $d_i$ to the chamber diameter $d_c$ was one to eight and the perforated area in each plate was fixed at 23% of the entire area, a decrease of about 19% resulted in the overall power requirements, as compared to the power required to force the drying medium through the drying chamber with no baffle plates. Reduction in the power needs can be attributed to the decreased dissipation of the momentum energy into eddy losses which results from a streamlining of the flow.

Although the general configuration of the drying chamber aside from the baffle plates is of the conventional type, in the present invention certain dimensional relationships are preferred to obtain the desired straight-line flow characteristics. Therefore, in addition to certain preferred dimensions of the baffles, corresponding preferred dimensions are desirable in certain diameters and overall dimensions of the chamber 11 and associated elements. For example, in the preferred embodiment, the inlet duct diameter $d_i$ is approximately $\frac{1}{8}$ to $\frac{1}{3}$ of the chamber diameter $d_c$ and the height of the drying chamber $h2$ from the transverse baffle plate 18 to the top portion of the conical section 12 is about 2 to 3 times the chamber diameter $d_c$.

In operation, the drying medium, usually heated air, passes through the inlet duct into the inlet chamber. Partial diffusion of some of the air is effected when it passes through the vertical baffle plate 19 while the remainder is diverted downwardly where the flow is divided. A portion of the downwardly directed flow passes through the perforations 20, 20 in the transverse plate intermediate the inlet duct 15 and the vertical baffle 19. The remaining portion passes through the opening formed by the lower edge of the vertical baffle 19 and the transverse baffle 18 and thence through apertures in the transverse baffle. The combined diffusion results in a uniform dispersion of the gaseous medium with a minimum of turbulence over the entire cross section of the flow chamber. While additional foraminous plates may be used, they are not usually needed, for the cooperating baffles of this invention co-act very effectively. The fluid medium may be air, nitrogen, carbon dioxide, vaporized liquids and the like, and these may be used at whatever temperature is desired. Most frequently heated air is used.

While the present invention has been illustrated and described in conjunction with spray drying apparatus, it will be apparent that the apparatus for producing uniform straight-line flow through a chamber may be readily applied to equipment other than spray dryers. For example, this uniform straight-line flow may also be utilized in drying chambers of conventional loop dryers, tray, or conveyor dryers, and may also be used in conjunction with spray cooling towers and dispersion dryers. The principles of this invention are applicable to a variety of and independent of the means of atomization or material distribution. This invention may be applied also to tunnel dryers, humidification towers, gas absorption and gas absorption towers, gas heaters or heat exchangers and gaseous phase chemical reactors.

From the foregoing, it will be apparent that the present invention provides a novel improvement in dryers and the like wherein a drying medium or the like is diverted by a series of baffles in such a manner to produce a straight-line flow of the medium through a chamber at uniform velocity regardless of the total flow of the medium. The velocity components are essentially axial, and with reference to the flow in the cylindrical coordinate systems embodied in most dryers the radial and tangential velocity components are negligible. The straight-line flow was verified by anemometer measurements and by static pressure measurements.

The process and apparatus of this invention are particularly important, advantageous and economical in applications in industry where headspace is limited; that is, the height of the chamber available for gas distribution is small, as, for example, only one-fifth of the chamber diameter. Similarly, if the inlet is relatively small as compared to the chamber diameter, as, for example, as small as about one-eighth, this being an inlet area ratio of $\frac{1}{64}$, this invention can and does provide a process and apparatus for getting substantial power savings and uniform results.

From the above it can be seen that the principles of this invention apply to structures having dimensions reasonably equivalent to those mentioned. Thus, the distance $h_1$ may be as much as $\frac{3}{8}$ the chamber diameter plus the diameter of the inlet at its discharge end. The perforations in the plate may be about $\frac{1}{16}$ to about $\frac{3}{16}$ inch in diameter. These are usually circular and uniformly placed and while other arrangements may be made, round openings uniform in place and size are preferred. Similarly, the distance $b$ may be, depending upon the location of the transverse plate, lengthened or shortened somewhat, the specified dimensions being preferred.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. A distributing head for uniformly dispersing a drying medium used to dry particles in a spray dryer or the like which head comprises a substantially enclosed chamber; a cover plate enclosing the top portion of the chamber; an inlet duct at one end of said chamber and interconnected with said chamber and providing a passageway for a gaseous medium being forced into said chamber; a foraminous baffle plate, through which said medium passes, extending substantially transversely and across the cross-sectional area of the chamber in a spaced parallel relationship with the cover plate, said baffle plate spaced downwardly from the cover plate a distance varying from about $\frac{3}{8}$ the chamber diameter plus about $\frac{1}{2}$ the diameter of the inlet duct discharge end to about $\frac{3}{8}$ the chamber diameter plus about the diameter of said discharge end; a second foraminous baffle plate within the chamber and projecting substantially vertically downward from the cover plate toward said transverse baffle plate a distance varying between a distance about equal to the dimension of the diameter of the inlet duct discharge end to a distance about equal to $\frac{1}{3}$ the chamber diameter plus $\frac{1}{2}$ the said discharge end diameter, said second plate being spaced from the inlet duct discharge end a distance ranging from about one to about two times the said discharge end diameter; and means for applying pressure to said medium, said pressure and said baffle plates being diffusers for said medium and causing uniform flow of said medium.

2. A distributing head for uniformly dispersing a drying medium used to dry particles in a spray dryer or the like which head comprises a substantially enclosed, elongated drying chamber; at one end of said chamber an inlet for said particles; at the same end of said chamber an inlet duct interconnected with said chamber through which a drying medium may be forced into said chamber; a foraminous baffle plate extending substantially transversely and across the cross-sectional area of said chamber; a second foraminous baffle plate mounted in the chamber substantially perpendicular to said first baffle plate and located in the path of a drying medium forced into the chamber, said baffle plates operable to diffuse the drying medium and to cause uniform flow of the medium through the chamber by means of a plurality of uniformly spaced openings in said baffle plates through which the drying medium passes, said openings in the first baffle plate defining an open area within the range of approximately 12% to about 40% of its total surface area and said openings in the second baffle plate defining an open area comprising between about 23% and about 40% of its total surface area; and means to remove the dried particles from said chamber.

3. A distributing head for uniformly dispersing a drying medium used to dry particles in a spray dryer or the like having therein means to distribute uniformly the particles to be dried and having means to remove the resultant dried particles and said medium which head comprises a substantially enclosed drying chamber mounted with its long axis in the vertical position; an inlet duct at one end of said chamber and interconnected with said chamber through which a drying medium may be forced into said chamber; a foraminous baffle located near said inlet duct and positioned parallel to the long axis of the said chamber; and a second foraminous baffle positioned near the free end of said first baffle and positioned transversely of said chamber to run from one wall of said chamber across to the other wall and providing a clearance between it and the said free end of the said first baffle, the said baffles coacting to diffuse said drying medium prior to the meeting of said medium with the said particles distributed to be dried.

4. A spray dryer or the like comprising a substantially enclosed chamber; a cover plate enclosing the top portion of the chamber; an inlet duct at one end of said chamber and interconnected with said chamber through which a drying medium may be forced into said chamber; dispensing means disposed in said chamber operable to discharge material to be dried into the chamber; a foraminous baffle plate extending substantially transversely and across the cross-sectional area of the chamber in a spaced, parallel relationship with the cover plate, said baffle plate being spaced downwardly from the cover plate a distance varying from about ⅜ the chamber diameter plus about ½ the inlet duct diameter at its discharge end to about ⅝ the chamber diameter plus the inlet duct discharge diameter; a second foraminous baffle plate within the chamber and projecting substantially vertically downward from the cover plate toward said first baffle plate a distance varying between a distance equal to about the dimension of the said inlet duct diameter to a distance equal to about ⅓ the chamber diameter plus about ½ the said inlet duct diameter, said second plate being spaced from the inlet duct entrance a distance ranging from about one to about two times the said inlet duct diameter; means to apply pressure on said drying medium to force it through said chamber, said pressure and said baffle plates operable to diffuse the drying medium and to cause uniform flow of the medium through the chamber; and means to remove the dried particles and said drying medium from the drying chamber.

5. Apparatus comprising a generally cylindrical material treating chamber; a cover plate enclosing the top portion of the chamber; an inlet duct adjacent the cover plate and interconnected with said chamber being located at one end of said chamber and providing a passageway for a gaseous medium being forced into said chamber; dispensing means, disposed concentrically and extending downwardly in said chamber, to discharge material to be treated into the chamber; a foraminous baffle plate extending substantially transversely and across the cross-sectional area of the chamber positioned between the cover plate and the discharge end of said dispensing means; and a second foraminous baffle mounted in the chamber substantially perpendicular to said transverse baffle plate and located in the path of said medium and between the discharge end of said inlet duct and the dispensing means but terminating just above the said transverse baffle plate, said baffle plates being diffusion agents for said gaseous fluid medium and causing uniform flow of said medium.

6. A spray dryer or the like comprising a substantially enclosed drying chamber; an inlet duct at one end of said chamber and interconnected with said chamber through which a drying medium may be forced into said chamber; dispensing means disposed in said chamber operable to discharge material to be dried into the chamber; a foraminous baffle plate extending horizontally and substantially transversely and across the cross-sectional area of the chamber; a second foraminous baffle plate mounted in the chamber substantially perpendicular to said first baffle plate and positioned near the said inlet duct and in the path of the drying medium forced into the chamber, but terminating just above the first baffle plate; pressure means for forcing said medium through said chamber, said pressure means and said baffle plates co-acting to diffuse the drying medium and cause uniform flow of the medium prior to the medium's reaching the said discharged material; an outlet for said medium; and means to remove the dried particles from the drying chamber.

7. A distributing head for uniformly dispersing a drying medium used to dry particles in a spray dryer or the like having therein means to distribute uniformly the particles to be dried and having a means to remove the resultant dried particles and said medium which head comprises a substantially enclosed drying chamber; an inlet duct interconnected with said chamber through which a drying medium may be forced into said chamber; means including a pair of baffle plates, one extending substantially transversely and across the cross-sectional area of said chamber and the other being substantially at right angles to this transverse plate and located near the orifice of said inlet duct which orifice is within said chamber, the said pair coacting to diffuse the drying medium forced into the chamber and to cause uniform flow of the medium through the chamber; and means defining a plurality of uniformly spaced openings extending transversely of said plates through which the drying medium passes, said openings having a diameter dimension that varies between about 1/16 and about 3/16 inch.

8. Apparatus for causing substantially straight-line flow of a gaseous medium through an elongated, vertical chamber comprising the said chamber; at the upper end an inlet duct for connection with said chamber and providing passageway for said medium into said said chamber; near said end a foraminous member extending substantially transversely and across the cross-sectional area of said chamber; a second foraminous member located intermediate said inlet duct and said transverse foraminous member near said inlet duct, said second foraminous member being located at a distance from said inlet duct of approximately one to about two times the inlet diameter at its discharge end and extending downwardly into said chamber from the top thereof across and spaced from said inlet and being substantially perpendicular to said transverse foraminous member and spaced therefrom to provide a clearance therebetween; and at the other end of said chamber an outlet for said medium.

References Cited in the file of this patent

UNITED STATES PATENTS

| | | |
|---|---|---|
| 1,782,822 | Hechenbleikner | Nov. 25, 1930 |
| 1,874,665 | Voorhies | Aug. 30, 1932 |
| 1,977,947 | Lutenbacher | Oct. 23, 1934 |
| 2,162,923 | Short | June 20, 1939 |
| 2,339,932 | Kuhl | Jan. 25, 1944 |
| 2,586,818 | Harms | Feb. 26, 1952 |

FOREIGN PATENTS

| | | |
|---|---|---|
| 889,439 | France | Jan. 10, 1944 |

UNITED STATES PATENT OFFICE
CERTIFICATE OF CORRECTION

Patent No. 3,113,062                          December 3, 1963

Walter T. Darnell

It is hereby certified that error appears in the above numbered patent requiring correction and that the said Letters Patent should read as corrected below.

In the grant, lines 1 to 3, for "Walter T. Darnell, of Wilmington, Delaware," read -- Walter T. Darnell, of Wilmington, Delaware, assignor to Fundamental Research, Inc., a corporation of Delaware, --; line 12, for "Walter T. Darnell, his heirs" read -- Fundamental Research, Inc., its successors --; in the heading to the printed specification, line 4, for "Walter T. Darnell, 19A Court Drive, Wilmington 5, Del." read -- Walter T. Darnell, Wilmington, Del., assignor to Fundamental Research, Inc., a corporation of Delaware --; column 1, line 9, for "thereof" read -- therefor --; line 11, after "of" insert -- the --; column 6, line 67, strike out "said", third occurrence.

Signed and sealed this 26th day of May 1964.

(SEAL)
Attest:

ERNEST W. SWIDER                                EDWARD J. BRENNER
Attesting Officer                                 Commissioner of Patents